United States Patent [19]

Takahashi et al.

[11] Patent Number: 4,644,156
[45] Date of Patent: Feb. 17, 1987

[54] CODE WHEEL FOR REFLECTIVE OPTICAL ROTARY ENCODERS

[75] Inventors: Yoshihiro Takahashi; Hiraku Abe; Yasuhiro Mamiya, all of Furukawa, Japan

[73] Assignee: Alps Electric Co., Ltd., Japan

[21] Appl. No.: 692,392

[22] Filed: Jan. 17, 1985

[30] Foreign Application Priority Data

Jan. 18, 1984 [JP] Japan ............................... 59-4175[U]

[51] Int. Cl.$^4$ ............................................. G01D 5/34
[52] U.S. Cl. .................. 250/231 SE; 29/578
[58] Field of Search .................. 250/231 SE, 237 G; 340/347 P; 356/374; 29/572, 578

[56] References Cited

U.S. PATENT DOCUMENTS 4,286,871 9/1981 Erickson ................. 250/237 G X

Primary Examiner—Eugene R. LaRoche
Assistant Examiner—Robert J. Pascal
Attorney, Agent, or Firm—Guy W. Shoup

[57] ABSTRACT

A code wheel for use in a reflective optical rotary encoder includes a code wheel body formed of a light-reflective material, and a photosensitive layer directly coated on a flat surface of the code wheel body and exposed to light to produce angularly spaced non-reflecting surfaces, thereby providing alternate reflecting and non-reflecting surfaces on the code wheel body. The speed and direction of rotation of the code wheel can be detected by radiating light onto the reflecting and non-reflecting surfaces and detecting light reflected by the reflecting surfaces.

6 Claims, 10 Drawing Figures

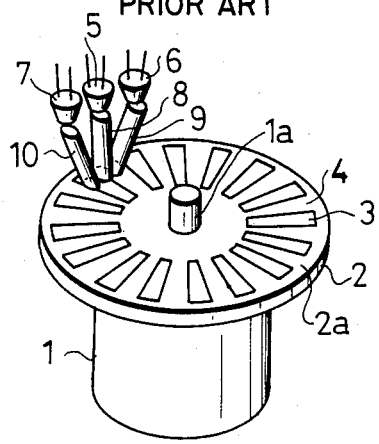
Fig. 1
PRIOR ART
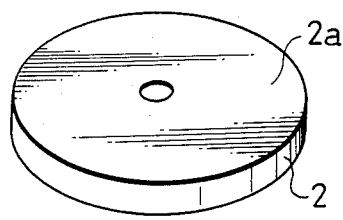
Fig. 2(a)
PRIOR ART
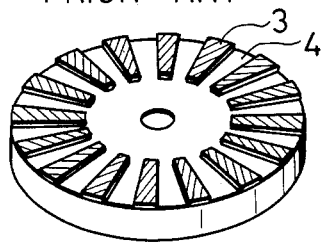
Fig. 2(b)
PRIOR ART
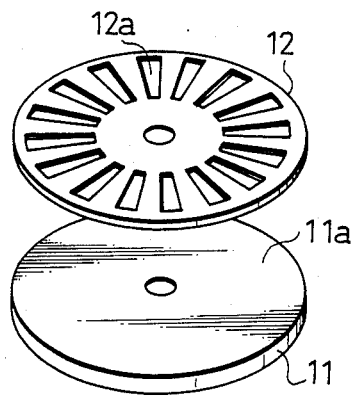
Fig. 3
PRIOR ART
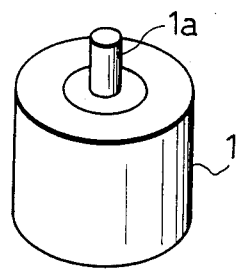

CODE WHEEL FOR REFLECTIVE OPTICAL ROTARY ENCODERS

BACKGROUND OF THE INVENTION

The present invention relates to a code wheel for use in a reflective optical rotary encoder, and more particularly to a code wheel for a reflective optical rotary encoder which detects the speed and direction of rotation of the code wheel by radiating light onto a pattern of reflecting and non-reflecting areas on the code wheel and receiving reflected light from the code wheel.

Conventional rotary encoder code wheels will be described with reference to FIGS. 1 through 3 of the accompanying drawings.

As shown in FIG. 1, a disk-shaped code wheel 2 is mounted on a shaft 1a of a motor 1 and has a flat upper surface 2a having thereon a plurality of radial, substantially sectorial reflecting areas 3 spaced at equal angular intervals and a plurality of radial non-reflecting areas 4 between the reflecting areas 3. A single light-emitting element 5 and two photodetectors 6, 7 one on each side of the light-emitting element 5 are disposed in confronting relation to the upper surface 2a with optical fibers 8, 9, 10 interposed. When the code wheel 2 is rotated, a beam of light emitted from the light-emitting element 5 is reflected by the reflecting areas 3 and detected by the two photodetectors 6, 7 as successive pulse signals, which are processed to determine the speed and direction of rotation of the code wheel 2.

FIGS. 2A and 2B show a conventional code wheel for use in the above encoder. The code wheel, designated at 2, is of a disk shape made of a non-reflecting material as shown in FIG. 2A. On the flat upper surface 2a of the code wheel 2, there are deposited radial sectorial reflecting layers 3 by hot stamping or vapor deposition as shown in FIG. 2B, leaving portions of the upper surface 2a between the adjacent reflecting members 3 as non-reflecting areas 4.

With the conventional code wheel as shown in FIGS. 2A and 2B, it is relatively expensive to form the reflecting layers 3, and the code wheel does not lend itself to mass production and hence cannot be lowered in cost.

FIG. 3 illustrates another conventional code wheel. The disk-shaped code wheel, denoted at 11, is formed of a reflecting material and has an upper surface 11a to which is applied a mask 12 of a non-reflecting material having radial sectorial slits 12a defined therein. Portions of an upper surface 11a of the code wheel are utilized as reflecting areas, while the mask 12 itself serves as non-reflecting areas.

The slits 12a in the mask 12 are normally punched or etched, a process which results in a poor parting accuracy of the edges of the slits 12a which define the reflecting and non-reflecting areas. The code wheel of FIG. 3 is therefore unable to increase the resolution of an encoder for detecting optical pulses.

SUMMARY OF THE INVENTION

With the foregoing problems in view, it is an object of the present invention to provide a code wheel for a reflective optical encoder, which can be mass-produced, is less costly, and has a high resolution.

To achieve the above object, a photosensitive layer is directly coated on an upper surface of a reflective code wheel, and a mask plate with slits defined therein is superimposed on the photosensitive layer, which is exposed to light through the slits in the mask plate, thereby providing alternate reflecting and non-reflecting surfaces.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a perspective view of an encoder with a conventional code wheel having reflecting and non-reflecting areas on an upper surface thereof;

FIG. 2A is a perspective view of a code wheel disk of a conventional code wheel;

FIG. 2B is a perspective view of the code wheel of FIG. 2A on which reflecting layers are deposited;

FIG. 3 is an exploded perspective view of another prior encoder;

DESCRIPTION OF THE PREFERRED EMBODIMENT

The present invention will be described with reference to FIGS. 4A through 4E and 5.

Figure 4A:
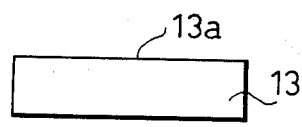
FIGS. 4A through 4E are views illustrative of progresssive steps of manufacturing a code wheel according to the present invention.
Figure 4B:
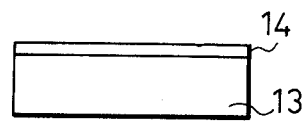
Figure 4C:
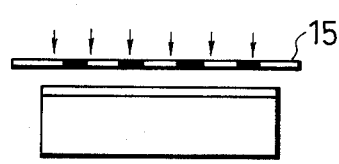
Figure 4D:
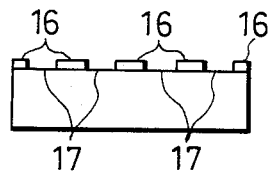

As shown in FIG. 4A, a code wheel disk body 13 is made of a light-reflective material having a flat upper surface 13a. The flat upper surface 13a is directly coated with a photosensitive layer 14 as shown in FIG. 4B. A mask plate 15 having slits defined therein is then superimposed on the code wheel disk body 13 over the photosensitive layer 14, which is then exposed to light through the slits in the mask plate 15, as shown in FIG. 4C. Thereafter, the mask plate 15 is removed, and exposed portions of the photosensitive layer 14 serve as non-reflecting surfaces 16, while masked portions of the photosensitive layer 14 serve as reflecting surfaces 17, as illustrated in FIG. 4D. The non-reflecting and reflecting surfaces 16, 17 are alternately positioned.

Figure 4E:
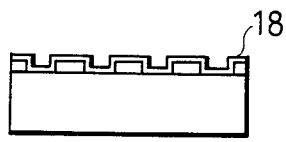

A surface coating layer 18 may be applied to the non-reflecting and reflecting surfaces 16, 17 as shown in FIG. 4E.

Figure 5:
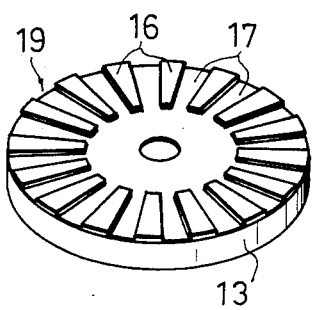
FIG. 5 is a perspective view of the code wheel of the invention.

FIG. 5 shows the code wheel, denoted at 19, thus manufactured. The code wheel 19 is used with the encoder in the manner as described above with reference to FIG. 1.

Examples of the method of manufacturing a code wheel as shown in FIGS. 4A through 4E will be described.

According to a first example, the reflective code wheel disk body was in the form of an aluminum disk which was anodized to produce an anodized coating layer of a desired thickness having a high reflectivity (about 90%), thus providing a reflecting surface. A photosensitive layer was coated on the reflecting surface of the disk body and exposed to light with masking used to form a highly precise pattern directly on the aluminum plate, thereby providing a code wheel. Non-reflecting areas had a reflectivity of 7% or lower, and the code wheel was well capable of detecting optical pulses. According to a second example, the reflective code wheel disk body was made of a polyester film with an aluminum layer formed thereon by vapor deposition, and a pattern was formed on the disk body in the same manner as described above with reference to the first example. The code wheel thus fabricated had reflecting areas of a reflectivity of 80% and non-reflecting areas of a reflectivity of 10% or less, and was also well capable of detecting optical pulses.

With the present invention, as described above, a code wheel can be fabricated by coating a photosensitive layer directly on a reflective body and exposing the photosensitive layer to light. The code wheel can be produced in a small number of steps with ease, and can well be mass-produced. Since a pattern of reflecting and non-reflecting areas is formed by photomasking, it can be produced highly precisely and in a short period of time. The code wheel can also be produced less costly due to the small number of manufacturing steps and its ability to be mass-produced.

Although a certain preferred embodiment has been shown and described, it should be understood that many changes and modifications may be made therein without departing from the scope of the appended claims.

What is claimed is:

1. In a reflective optical rotary encoder of the type having a code wheel with a surface provided with alternating reflective and non-reflective sectorial areas spaced at predetermined angular intervals, and a photodetector for radiating light onto said areas and detecting light reflected from the reflective areas, whereby the speed and direction of rotation of the code wheel can be determined, the improvement wherein a code wheel body of said code wheel including said surface is formed of a light-reflective material and has directly coated on said surface a non-reflective photosensitive layer having alternating sectorial areas etched away by exposure to light to expose said light-reflecting surface beneath, so as to provide said alternating reflective and non-reflective sectorial areas.

2. A code wheel according to claim 1, further including a protective coating layer deposited on said reflecting and non-reflecting areas, to protect said areas.

3. A code wheel according to claim 1, wherein said code wheel body is made of aluminum.

4. A code wheel according to claim 1, wherein said code wheel body is made of polyester film with an aluminum layer thereon.

5. In a method of making a reflective optical rotary encoder of the type having a code wheel with a surface provided with alternating reflective and non-reflective sectorial areas spaced at predetermined angular intervals, and a photodetector for radiating light onto said areas and detecting light reflected from the reflective areas, whereby the speed and direction of rotation of the code wheel can be determined, the improvement comprising the steps of:

forming a code wheel body of said code wheel including said surface of a light-reflective material;

directly coating on said surface a non-reflective photosensitive layer; and etching away alternating sectorial areas of said photosensitive layer by exposure to light through a mask to expose said light-reflecting surface beneath, thereby providing said alternating reflective and non-reflective sectorial areas.

6. An improved method of making a reflective optical rotary encoder according to claim 5, further comprising the step of forming a coating layer over said reflective and non-reflective areas, to protect said areas.

* * * * *